Jan. 26, 1954

E. LEHMANN, SR 2,667,006

WEEDLESS ARTIFICIAL BAIT

Filed Oct. 27, 1950

INVENTOR,
ELMER LEHMANN SR.,
BY Terry & Cohn
ATTORNEYS.

Patented Jan. 26, 1954

2,667,006

UNITED STATES PATENT OFFICE 2,667,006

WEEDLESS ARTIFICIAL BAIT

Elmer Lehmann, Sr., Belleville, Ill.

Application October 27, 1950, Serial No. 192,456

4 Claims. (Cl. 43—35)

This invention relates to improvements in weedless artificial bait, and more particularly to an improved fishing lure of a type in which one or more spring-actuated hook elements may be concealed or shrouded during casting or trolling, in a snag-proof or weedless relation to the body of the bait, such as a plug, and yet which, upon first contact thereof by the fish, will immediately cause the hook structure to assume an active, extended position.

It is a major and principal objective of the present designs of artificial bait, to provide an article which requires but a few parts of simplified construction, is positive in its releasing action, yet certain of retention of the hooks in inoperative position when so desired.

A still further object is realized in a provision, which may be regarded as optional, of a forwardly and downwardly projecting flexible fin element carried by the head of the plug, and which, alone or in coaction with a frontal concavity, will produce a desirable life-like diving and surfacing action of the plug in the course of casting or trolling.

The foregoing and numerous other objects of the invention will more clearly appear from the following detailed description of certain presently preferred embodiments of the invention, particularly when considered in connection with the accompanying drawing, in which.

Figure 1:
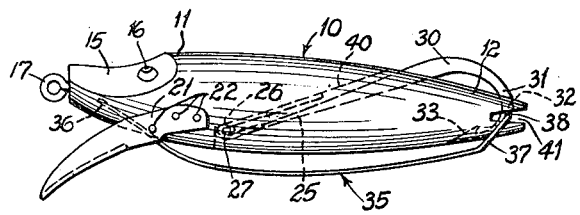
Fig. 1 is a side elevation of a simplified embodiment of the improvements in an artificial lure of plug type, certain parts normally internal of the plug body being shown in dotted lines.
Figure 2:
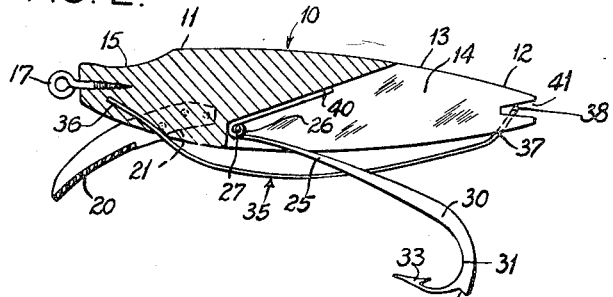
Fig. 2 is a longitudinal vertical section of the bait shown by Fig. 1, but showing the hook element thereof in extended position rather than retracted as shown by Fig. 1.
Figure 3:
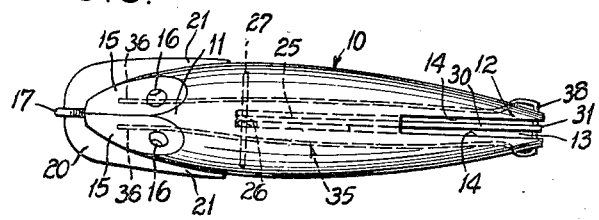
Fig. 3 is a top or plan view of the plug of Figs. 1 and 2.

Referring now by characters of reference to the drawing, and first to Fig. 1, the body indicated generally at 10, is preferably of a floating impervious material which may consist of a dense but relatively light wood suitably treated as by enamelling or painting, or may be molded of any suitable plastic material, but without limitation to those materials mentioned. The body for convenience of present description, may be said to comprise a head portion 11 and a tail portion 12, the arbitrary line of division between the head and tail portion being for convenience noted as the forward end of the slotted region of the tail of the body. It will appear from the section of Fig. 2 and from the top view of Fig. 3, that the slot indicated at 13 is relatively narrow, extends along a longitudinal midplane of the tail and in the assembly of Figs. 1, 2 and 3, is of considerably greater fore and aft extent along the bottom of the tail than along the top portion thereof, one of the boundary walls of the slot being indicated at 14 (Fig. 2).

The forward or leading end of the plug 10 usually herein referred to as head 11, is provided with a concave frontal recess 15 provided with contrasting projected or countersunk portions 16 in simulation of eyes of a fish or other living creature. At the extreme frontal or nose end of the structure is provided a traction eye element 17 to which is attached for example, a casting line, through which the plug is drawn through the water in the usual manner.

Extending forwardly and downwardly of the head portion 11 and just below the dished region 15, is a flexible fin comprised of a shovel-shaped plate portion 20 which merges rearwardly into a pair of spaced attachment arms 21 which, through attachment pins 22 embedded in the head of the body, support the fin in such position that it projects forwardly and downwardly at about 45 degrees to the axis of the body of the plug. This fin, in coaction with the concavity 15, as the bait is drawn through the water, imparts thereto an up and down surfacing and diving motion, with realism in simulation of the movement of many fish, thus adding materially to the attraction of the lure.

Proceeding now to describe the arrangement and structure of the hook element of the first embodiment, this comprises a long, tapered spring metal shank 25, the hook being mounted so that it extends rearwardly along the midplane of the slot 13. Disposed in the forward end portion of the slot 13 is a spring loop 26 that is an integral part of the hook at one end of shank 25, one tang of which bears firmly against a sloping shoulder 40, later described, interiorly of the tail part of the bait. A small cross pin 27 traverses the forward end portion of the slot 13, and serves to extend through the loop to position the hook when same is impelled between the active position shown by Fig. 2, and a shrouded or retracted position, as in Fig. 1.

In the hook, the shank 25, somewhat beyond its anchored end, is preferably flattened, and is of increasing width as shown at 30 which flattened portion extends to the bight region 31 of the hook, and at about the center of the width thereof at the bight is formed a pronounced notch, shown as a shoulder 32 on the convex side of the bight of the hook. Beyond the shoulder, the hook is extended to provide a free end portion carrying the barb 33.

A trigger spring which in form is a long, longitudinally extended bow spring, is indicated generally at 35. This spring in Figs. 1, 2 and 3, approximates the length of the plug or body and has one end 36 anchored in the head portion of the body. From this anchored portion the trigger spring emerges in a smoothly rounded portion that lies for the most part externally of the plug substantially as shown by Figs. 1 and 2. The body of the bait as a whole is of a substantially streamlined shape, and the bow spring, although spaced slightly from the body, will follow the contour thereof, being extended inwardly or toward the body as it approaches the extremity of the tail thereof. Toward its rearmost end of the spring 35 is extended sharply upwardly to form a portion 37, beyond which is a relatively short horizontal latch arm member formed integrally thereon and indicated at 38. There has thus far been described a plug in which bow spring 35 may consist of a single spring arm. However, in the preferred plug structure, the bow spring 35 embodies a pair of the portions 36 as will appear from the full and dotted lines of the spring in Fig. 3. From Fig. 3, it is seen that the paired arms of the spring 35 extend rearwardly as a bifurcate element, the spring being provided at the rear with a horizontal linear bight portion that constitutes the latch arm 38.

The action of the parts as shown by Figs. 1, 2 and 3 is thought now to have become apparent from the foregoing description of parts, but it may be noted for completeness that before the lure or bait is cast or otherwise placed in action, the hook structure will be manually pressed inwardly of the plug, specifically into the slot 13 thereof, against the loading of the spring shank 25 of the hook, so as to bring the same substantially within the slot so that the barb and substantially the greater portion of the hook, is shrouded or concealed by the sides of the tail of the body, a stop position of the shank being determined by abutment thereof against the sloping shoulder 40. This linear ledge extends from the top of the slot 13 thence longitudinally and downwardly of the body close to the region of anchorage of the spring shank. When the hook is thus brought to partially concealed, substantially shrouded or inoperative position, the relatively lightly loaded spring 35 which tends to bring the latch arm 38 forwardly of the body, will cause the notch adjacent shoulder 32 to latch into place behind the arm 38, which will thus serve to retain the hook as shown in Fig. 1, until further release thereof.

Release of the hook is effected by a light pressure against the bow spring 35 in a direction toward the body 10. This action produced by a strike or other first contact by the fish, causes a rearward movement of the latch arm 38 to bring same away from the shoulder 32, whereupon the spring loading of the hook shank will force the hook outwardly of its operative position as shown by Fig. 2. It may be noted as desirable that the latch arm 38 is guided through a short range of fore-and-aft movement by a guide which, as shown by Figs. 1 and 2, consists of a slot extending somewhat forwardly of the rear end of the extreme tail portion of the bait, such slot being indicated at 41.

Figure 4:
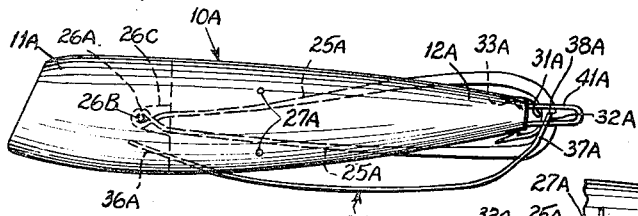
Fig. 4 is a side elevation of a somewhat modified form of plug or bait employing multiple retractible hook elements.
Figure 6:
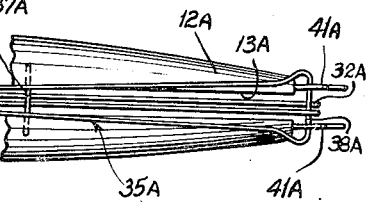
Fig. 6 is a fragmentary bottom plan view of the assembly of Figs. 4 and 5, showing a tail portion of the body of the bait and certain appurtenances.
Figure 5:
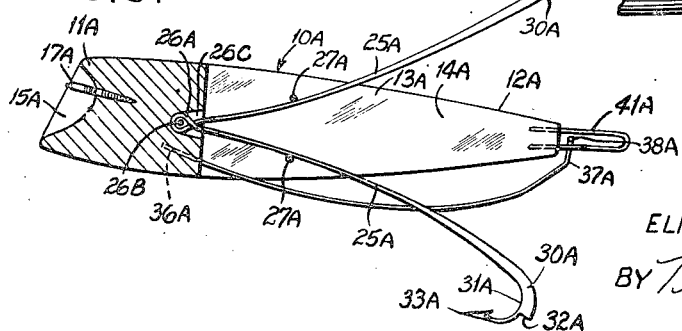
Fig. 5 is a longitudinal vertical section of the device shown by Fig. 4, but showing the paired hook elements in extended relation.

In the embodiment according to Figs. 4, 5 and 6, essentially the same principles of actuation and of structure as heretofore described are utilized in a double hook assembly. Although the fin structure 20 and 21 is omitted from Figs. 4, et seq., it will be understood that this arrangement is equally adapted for attachment of the fin when desired.

In Figs. 4 and 5 are shown a somewhat more deeply dished frontal cavity 15A, in the deepest portion of which is located the traction eye 17A. The proportions and shape of the streamlined body 10A are substantially the same as in Figs. 1, except that the slot 13A is open uniformly above and below the body, and the slot is of tapered width from its forward end to its trailing end.

As will appear from Fig. 5, a single spring element serves or may serve as the shanks of paired hooks, these being indicated at 25A and both of which merge into a closed loop portion 26A through which extends a pivot pin 26B located in a suitable recess 26C just forwardly of the slot 13A and into which the recess 26C opens. Somewhat forwardly of the anchorage regions of the spring hooks are a pair of vertically spaced cross or limit pins 27A each bridging the slot 13A and each serving to limit the outward movement of one of the hooks, as will appear from Fig. 5.

In the modified double hook structure each of the spring shanks 25A is continued into a flattened and widened shank portion 30A, thence into a curved or bight portion 31A each being provided with an external notch adjacent a shoulder 32A, and a barbed or pointed portion 33A. It will have been noted that insofar as there is a conformance of general structure between the two forms described, the reference characters in the description of Figs. 4, 5 and 6 correspond to those of Figs. 1, 2 and 3 except for the addition of suffix letter A.

A further minor modification best appears in Fig. 5, wherein there is shown a pair of wire eyes or loops 41A which serve as a guide for the horizontally movable latch arm portion 38A forming the bight of a double bow trigger spring, formation of the two arms of which may be, if desired, identical with those of the spring 35, and which is generally indicated in Figs. 4 and 6 at 35A.

The crossed loop or eye portion 26A (Fig. 5) is so formed that the two hooks 25A will retract in close adjacence, but obviously will when released extend in opposite directions, since the hooks are relatively reversed. Each hook is guided in each of the forms described, to a certain extent by the side walls such as 14 or 14A, bounding the slot 13 or 13A. The shoulders 32A of the two hooks of Figs. 4 and 5 will be oppositely presented to the horizontal latch arm 38A of the spring 35A. The action of the longitudinally movable arm 38A of the trigger spring, is such that this arm moves away from both of the shoulders 32A simultaneously, incident to a pressure against the trigger spring in a direction toward the body 10A, thus concurrently releasing both hooks under the action of their spring shanks 25A when a light pressure toward the body is applied to the spring.

From the structure described, there will have appeared several advantages in locating the shoulders 32 and 32A and the latch arm 38 or 38A in the outermost or rearmost zones of the hook. In this region, unit pressures between the parts are minimized, with greater ease and assurance of quick release. Also, this relation of the parts of the trigger mechanism results in automatic resetting of the latch arm in the notches, merely upon restoration of the hook or hooks to partially concealed position, due to the fact that part 38 or 38A is spring-biased in a forward direction.

It will have appeared that the embodiments described are of simple, inexpensive construction; that each of the structures described will fully realize each of the objects hereinabove expressed and others implied.

Although the invention has been described by particularized reference to certain commercially desirable forms, the detail of description should be understood in an illustrative rather than in any limiting sense, numerous variants being possible within the fair scope of the claims hereunto appended.

I claim as my invention:

1. In an artificial bait, an elongate body including a substantially solid head portion, a tail portion of a rearwardly tapering cross section provided with a longitudinal slot, a hook including a long spring shank, a bight and a barb, the forward end of the shank being anchored in the body at the forward end of the slot but close to the longitudinal midplane of the slot, the hook being of a length and otherwise proportioned so that the barb and the greater part of the shank may occupy a position within the slot so as to be shrouded by the tail portion of the body, the hook being provided with a distinct shoulder on the outermost portion of the bight region, the said bight region being provided with a camming surface adjacent the shoulder, an elongate bow spring having a forward end anchored in a region of the body close to the forward end of the hook shank, a latch arm on the opposite or rear end of the bow spring, and means providing a guide for the latch arm in the tail region of the body, the camming surface of the bight region being adapted to displace the latch arm against the bias of said bow spring upon movement of the hook into retracted position, whereby to cause self engagement of said latch arm and shoulder, the spring latch arm coacting with said shoulder of the hook to keep the hook releasably retained in retracted position, and the bow spring being arranged upon a minor pressure in a direction toward the bait body, to move the latch arm in a direction rearwardly of the body and away from the hook shoulder for release of the hook to an extended, active position, the spring shank of the hook acting thus to extend the hook bight and barb upon release of the latch arm.

2. In an artificial bait or lure of plug type, an elongate substantially streamlined body including a solid head portion, a tapered tail portion provided with a relatively narrow longitudinal slot, a hook including a spring shank, a bight and an outer barbed free end, the inner end of the shank being secured in a transversely central portion of the body forwardly of the slot, the hook and slot being so proportioned in length that the barbed end of the hook may repose in the slot, shrouded by the tail portion of the body, the hook being provided with a distinct notch or shoulder formation on the outermost portion of the bight region, the bight region being provided with a curvilinear camming surface adjacent the shoulder formation, an elongate wire spring extended fore-and-aft of the body and having its forward end anchored in the body close to the head portion thereof, said spring serving as a hook-retaining and -releasing member and the rearmost end of the spring being extended transversely of the body and coacting with the shoulder formation of the hook in the relation of a latch and latch arm, and means at the rear extremity of the body, forming guiding surfaces for the latch end of the spring, constraining same to a horizontal sliding movement, the wire spring being arranged to spring-bias the latch end of the spring in a forward direction, the said camming surface being adapted to displace the latch end of the spring rearwardly of the body in a horizontal plane against the loading of said wire spring upon movement of the hook to the retracted position, whereby to cause self engagement of the latch end of the spring and said shoulder formation, the spring being arranged upon pressure in a direction toward the body, to move the latch end of the spring in a direction rearwardly of the body and away from the shoulder formation, said wire spring extending rearwardly of its point of anchorage along, but in spaced relation to the body, and, with the hook in retracted position in said slot, serving as a weed guard.

3. In an artificial fish bait or lure of plug type, an elongate body including a substantially solid head portion provided with a frontal dished cavity, a line attachment eye extending forwardly from said cavity, a tail portion of the body formed to provide a narrow slot extending through said tail portion, a pair of hooks each including a relatively long spring shank, each of said shanks being operatively connected into the head portion forwardly of said slot and each hook shank having a flattened region extending into a bight portion, the hook thence extending into an outer barbed free end, the bight portion of each hook being provided with a notched formation on the outermost portion of the bight thereof, each bight portion being provided with a curvilinear camming surface adjacent the notched formation, the forward ends of the shanks of the paired hooks being integrally connected through a loop portion, a pivot pin extending transversely through the head portion and through said loop portion, a pair of limit pins in the tail portion of the body slightly rearwardly of the head portion, the paired hooks being relatively reversely arranged in such manner that they are thus adapted, each under the action of its spring shank, to extend in opposite directions along a vertical midplane of the body, an elongated wire trigger spring anchored within the head portion of the body, thence extending along the slotted region of the tail portion, thence bent to form a transverse arm serving as a latch arm in coaction with the notched formations on the bight portions of the hooks, the wire spring being arranged to bias the latch arm in a direction forwardly of the body, a guide loop in the extreme free end of the tail portion of the body in which said latch arm operates in a fore-and-aft direction, the camming surface on the bight portion of each hook being formed to displace the latch arm against the bias of the said wire spring upon pivotal movement of said hooks to the retracted positon, whereby to realize self engagement of the latch arm with said notched formations, the hooks being adapted to be releasably held within the slot of the tail of the body, by engagement of said latch arm with said notched formations, and the arrangement of the hooks, slot, latch arm and spring being such that pressure against the spring toward the body acts to move the latch arm rearwardly out of engagement with said notched formations.

4. In an artificial bait of weedless retractible hook type, an elongate, substantially streamlined body including a head portion, a longitudinally slotted tail portion, an external trigger spring extended along the slotted tail portion of the body and including a transverse latch arm, a horizontal guide for said arm carried by the tail portion of the body, a hook normally substantially concealed within the slotted tail portion, said hook including an attached inner end and an outer free end, the inner end of the hook being operatively connected to the head portion of the body forwardly of the slotted tail portion, said hook being provided close to the free end of the hook with a shoulder engageable by the arm of said spring, for releasable retention of the hook, the hook being provided with a camming surface adjacent the shoulder, said camming surface being adapted to displace the coacting latch arm in said guide, the hook including an integral spring shank adapted to impel the hook outwardly of the slot upon latch-releasing action of the trigger spring, and the hook, together with the shoulder, camming surface and coacting latch arm being related for self engagement of the latch arm and shoulder when the hook is moved into concealed position.

ELMER LEHMANN, Sr.

References Cited in the file of this patent
UNITED STATES PATENTS

| Number | Name | Date |
|---|---|---|
| 886,794 | Gilmore | May 5, 1908 |
| 969,014 | Walters | Aug. 30, 1910 |
| 1,920,991 | Lahm | Aug. 8, 1933 |
| 2,205,773 | Fox | June 25, 1940 |